(12) United States Patent
Kim

(10) Patent No.: US 8,026,924 B2
(45) Date of Patent: Sep. 27, 2011

(54) DISPLAY SYSTEM AND METHOD FOR DISPLAYING VIDEO SIGNALS

(75) Inventor: Young-chan Kim, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 900 days.

(21) Appl. No.: 12/023,150

(22) Filed: Jan. 31, 2008

(65) Prior Publication Data

US 2008/0309821 A1 Dec. 18, 2008

(30) Foreign Application Priority Data

Jun. 13, 2007 (KR) .................. 10-2007-0057867

(51) Int. Cl.
*G09G 5/00* (2006.01)
*G06F 17/00* (2006.01)
*G06F 15/00* (2006.01)
*H04N 7/00* (2006.01)
*H04N 5/445* (2006.01)
*H04N 5/66* (2006.01)
*G06K 9/40* (2006.01)

(52) U.S. Cl. ........ 345/581; 345/619; 345/418; 345/902; 345/501; 348/474; 348/563; 348/739; 382/254; 382/274; 382/276

(58) Field of Classification Search .................. 345/418, 345/581, 619, 501, 629–630, 902, 617; 348/473–474, 552, 563, 564–565, 569, 739; 382/254, 274, 276; 715/809–810

See application file for complete search history.

(56) References Cited

U.S. PATENT DOCUMENTS

| 5,907,820 | A | * | 5/1999 | Pan ............................. 702/155 |
| 6,670,964 | B1 | | 12/2003 | Ward et al. |
| 2001/0004254 | A1 | | 6/2001 | Okahara et al. |
| 2002/0075301 | A1 | | 6/2002 | Basso et al. |
| 2004/0210843 | A1 | * | 10/2004 | Kim ............................. 715/700 |
| 2005/0264693 | A1 | * | 12/2005 | Kondo et al. ................. 348/458 |
| 2006/0222246 | A1 | | 10/2006 | Murai et al. |
| 2009/0118018 | A1 | * | 5/2009 | Perlman et al. ................. 463/42 |

* cited by examiner

*Primary Examiner* — Wesner Sajous
(74) *Attorney, Agent, or Firm* — Sughrue Mion, PLLC

(57) ABSTRACT

A method for displaying a video signal and a display system using the same are provided. According to the method for displaying a video signal, the display system provides a setting menu through which a user can set an output resolution according to an occupancy level of a control means, and adjusts a resolution of video to be output to a display means according to the occupancy level of the control means. If video is not transmitted to the display means, the display system may display a warning message, so that a user can know the reason therefor. Therefore, it is possible to always provide a user with video optimized according to an occupancy level of a control means.

25 Claims, 9 Drawing Sheets

DISPLAY SYSTEM AND METHOD FOR DISPLAYING VIDEO SIGNALS

CROSS-REFERENCE TO RELATED APPLICATIONS

This application claims priority from Korean Patent Application No. 10-2007-0057867, filed on Jun. 13, 2007, in the Korean Intellectual Property Office, the disclosure of which is incorporated herein by reference in its entirety.

BACKGROUND OF THE INVENTION

1. Field of the Invention

Systems and methods consistent with the present invention relate to displaying a video signal, and more particularly, to displaying a video signal in which the video resolution is adjusted and the video is displayed according to the available resources of a personal computer (PC).

2. Description of the Related Art

Display systems can display video corresponding to video data input from external devices, and include personal computers (PCs), which display video on display means such as monitors.

FIG. 1 is a view showing a related art display system. In FIG. 1, a PC is shown as a display system which comprises a host device 10 and a monitor 100 as a display means.

The host device 10 displays on the monitor 100 video corresponding to video data input via a network or video data recorded on a detachable recording medium.

FIG. 2 is a flowchart explaining a process for displaying video in the related art display system. In FIG. 2, the host device 10 adjusts the resolution of the video data to a preset resolution (S210). The host device 10 then transmits the video data having the adjusted resolution to the monitor 100 (S220).

The monitor 100 decodes the video data transmitted from the host device 10 (S230). The monitor 100 determines a mode of the decoded video data, scales the video data according to the determined mode (S240), and then displays the scaled video data (S250).

In the display system, for example, a PC, the image quality can vary according to an occupancy level of a central processing unit (CPU). The occupancy level of the CPU refers to the number of tasks currently performed by the CPU, which may be checked by the Windows task manager.

Specifically, if the occupancy level of the CPU is high and if the video has a high resolution, the quality of the displayed image may be reduced. In other words, because the amount of video data transmitted to the monitor gradually increases as the resolution of video becomes higher, it is difficult to transmit video data normally when the CPU is performing other tasks.

Accordingly, if video with a high resolution is displayed when the occupancy level of the CPU increases due to other tasks, the image quality can be reduced. In the worst circumstances, it is impossible to transmit video data to the monitor, which causes a screen to become inactive. Furthermore, general users are unaware of the cause of such problems, which increases user inconvenience.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for displaying a video signal, in which a resolution of video to be output can be adjusted according to an occupancy level of a control means, and a display system using the same.

The present invention also provides a method for displaying a video signal, which enables a user to set an output resolution of video according to an occupancy level of a control means, and a display system using the same.

The present invention also provides a method for displaying a video signal, which enables a user to adjust a resolution of video to be output so that the resolution matches an occupancy level of a control means, and a display system using the same.

Additionally, the present invention also provides a method for displaying a video signal, which informs a user of the reason that video is not transmitted to a display means, and a display system using the same.

Consequently, according to aspects of the present invention, display attributes, such as a display resolution of a video signal, are adaptively adjusted or determined according to the settings of a video signal providing device that provides video signals, and are output, so that the video signal can be displayed according to the display attributes transmitted from the video signal providing device.

According to an aspect of the present invention, there is provided a method for displaying a video signal in a display system comprising a host comprising a control means for controlling a plurality of devices and a video signal output unit for outputting a video signal, and a display means for displaying the output video signal, the method comprising: adjusting, by the host, a resolution of a video signal to be output, according to an occupancy level of the control means, and outputting the video signal at the adjusted resolution; and displaying, by the display means, the video signal having the resolution adjusted by the host.

The host may comprise a computer, and the occupancy level of the control means may comprise the number of tasks performed by a central processing unit (CPU) of the computer.

The adjusting may comprise checking the occupancy level of the control means; determining whether the checked occupancy level of the control means reaches a level at which it is impossible to output video; and confirming an outputtable resolution set according to the checked occupancy level of the control means if it is determined that the checked occupancy level of the control means does not reach the level at which it is impossible to output video.

The adjusting may further comprise providing a resolution adjustment selection menu through which a user can select whether the resolution of the video signal to be output is adjusted to the outputtable resolution, if the resolution of the video signal to be output is greater than the outputtable resolution.

The resolution adjustment selection menu may provide one of the outputtable resolution and a preset recommended resolution, and may comprise a field to select resolution adjustment and a field to maintain the current resolution.

If a resolution adjustment command is input through the resolution adjustment selection menu, the adjusting may further comprise adjusting the resolution of the video signal to be output to the outputtable resolution.

If it is determined that the checked occupancy level of the control means reaches the level at which it is impossible to output video, the adjusting may further comprise transmitting a warning display command to the display means.

The method may further comprise providing a setting menu through which a user can set an outputtable resolution according to the occupancy level of the control means. The setting menu may comprise a field to select the outputtable resolution according to the occupancy level of the control means.

According to another aspect of the present invention, there is provided a display system comprising a host which adjusts a resolution of a video signal to be output according to an occupancy level of the control means and outputs the video signal at the adjusted resolution, the host comprising a control means which controls a plurality of devices and a video signal output unit which outputs a video signal; and a display means which displays the video signal output from the host.

The host may comprise a computer, and the occupancy level of the control means may relates to the number of tasks performed by a central processing unit (CPU) of the computer.

The control means may check the occupancy level, may determine whether the checked occupancy level reaches a level at which it is impossible to output video, and may confirm an outputtable resolution set according to the checked occupancy level if it is determined that the checked occupancy level of the control means does not reach the level at which it is impossible to output video.

The host may comprise an on-screen-display (OSD) generator which provides a resolution adjustment selection menu. If the resolution of the video signal to be output is greater than the outputtable resolution, the control means may control the OSD generator to provide the resolution adjustment selection menu through which a user can select whether the resolution of the video signal to be output is adjusted to the outputtable resolution.

The resolution adjustment selection menu may provide one of the outputtable resolution and a preset recommended resolution, and may comprise a field to select resolution adjustment and a field to maintain the current resolution.

If a resolution adjustment command is input through the resolution adjustment selection menu, the control means may adjust the resolution of the video signal to be output to the outputtable resolution.

If it is determined that the checked occupancy level of the control means reaches the level at which it is impossible to output video, the control means may transmit a warning display command to the display means.

The display means may comprise a display on which a warning message is displayed; an OSD generator which displays the warning message; and a scaler which controls the OSD generator to display the warning message if the warning display command is input.

The scaler may determine whether a synchronizing signal is input in order to display the warning message, and may control the OSD generator in the free-run state if it is determined that the synchronizing signal is not input.

The OSD generator may provide a setting menu through which a user can set the outputtable resolution according to the occupancy level of the control means. The setting menu may comprise a field to select the outputtable resolution according to the occupancy level of the control means.

The host may communicate with the display means via one of a universal serial bus (USB), a unified display interface (UDI) and a display port.

According to an aspect of the present invention, there is provided a method for displaying a video signal in a display system comprising a host comprising a control means for controlling a plurality of devices and a video signal output unit for outputting a video signal, and a display means for displaying the output video signal, the method comprising: receiving a video signal having display attributes adjusted adaptively according to the conditions of the control means by the host, and displaying the video signal received from the host.

The conditions of the control means may comprise a mode of the video signal, and the host may adjust the display attributes adaptively according to the mode of the video signal.

The mode of the video signal may comprise a game mode, a movie mode, an Internet mode and a text mode. The display attributes may comprise a resolution and a brightness which are capable of being adjusted adaptively according to the mode of the video signal.

The conditions of the control means may comprise an occupancy level of the control means, the host may comprise a computer, and the occupancy level of the control means may relates to the number of tasks performed by a central processing unit (CPU) of the host.

The display attributes adjusted by the host may be displayed through an on-screen-display (OSD).

The OSD may be displayed overlapping with the video signal output from the host, or may be displayed for a predetermined period of time by an OSD generator included in the display means in response to a control command from the control means of the host.

The host may communicate with the display means via one of a universal serial bus (USB), a unified display interface (UDI) and a display port.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
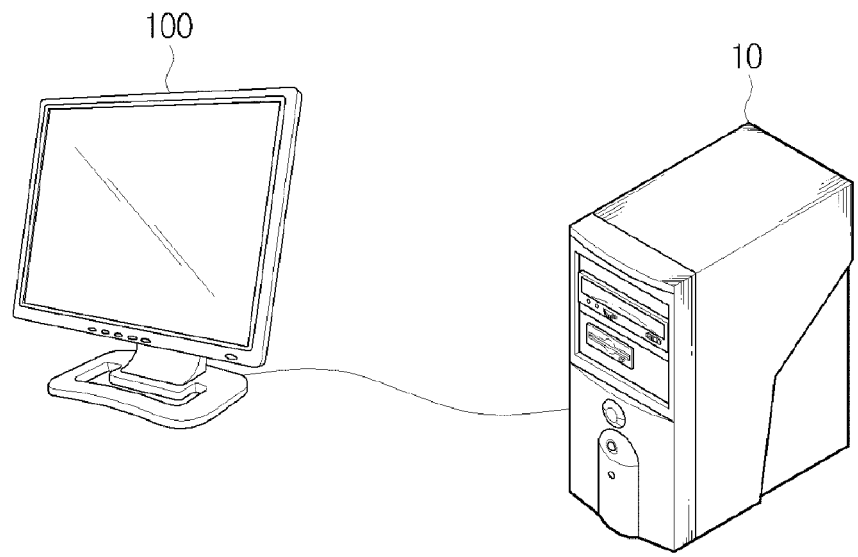
FIG. 1 is a view showing a related art display system.
Figure 2:
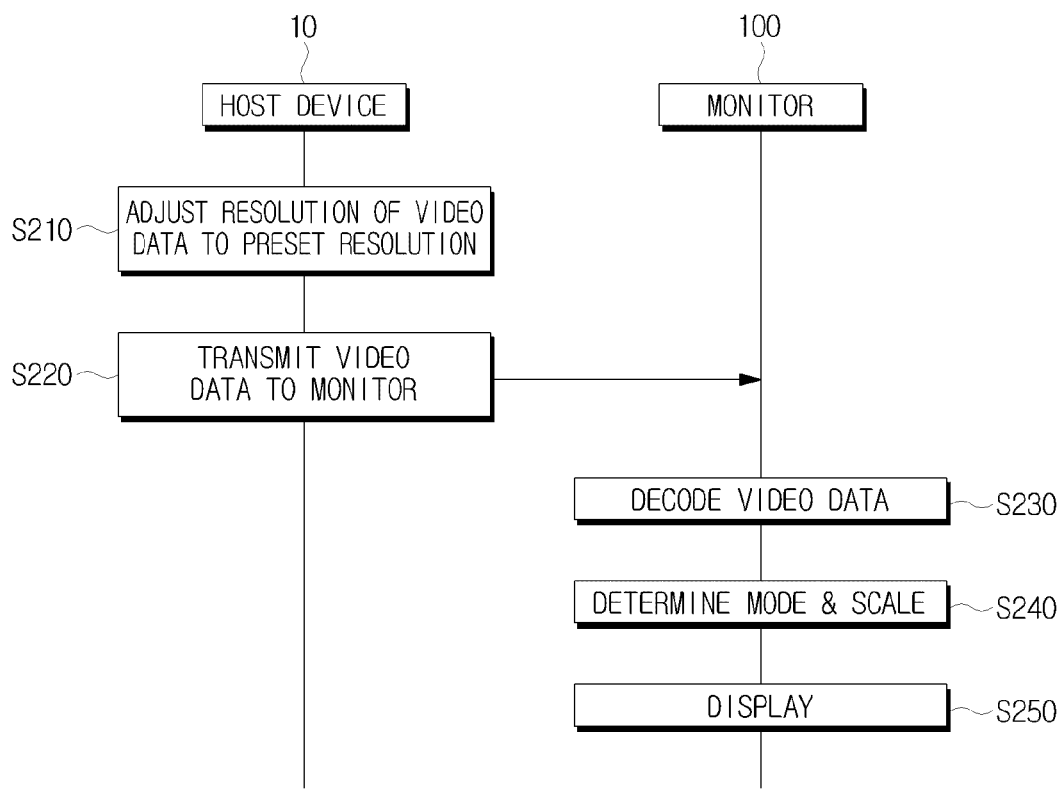
FIG. 2 is a flowchart explaining a process for displaying video in the related art display system.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 3:
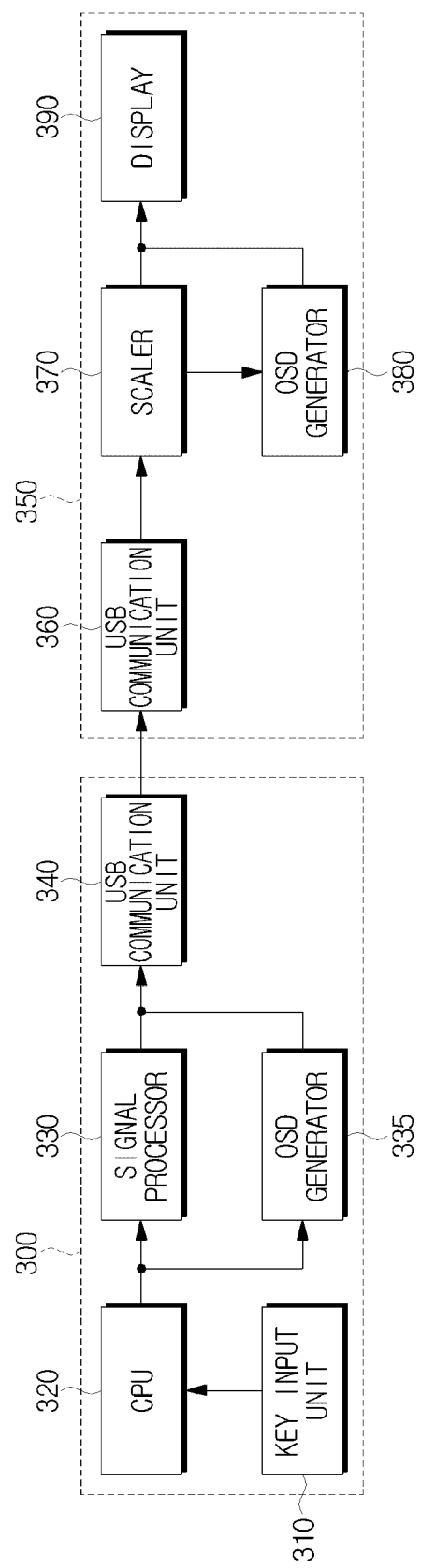
FIG. 3 is a block diagram of a display system according to an exemplary embodiment of the present invention.

FIG. 3 is a block diagram showing a configuration in which a personal computer (PC) is used as a display system according to an exemplary embodiment of the present invention.

The PC is used as a display system which adjusts a resolution of video to be output to a display means according to an occupancy level of a control means. The PC provides a setting menu through which a user can set an output resolution of video according to the occupancy level of the control means.

Referring to FIG. 3, the PC comprises a host device 300 and a monitor 350. The host device 300 may communicate with the monitor 350 through one of a universal serial bus (USB), a unified display interface (UDI) and a display port.

The UDI provides a universal connection method to connect display apparatuses, such as a PC, a notebook monitor, a high-definition television (HDTV) and a projector. The UDI also provides compatibility with a digital video interface (DVI), which is currently the standard connection method, while providing complete compatibility with a high-definition multimedia interface (HDMI), which is the standard connection for the HDTV. Accordingly, the UDI enables both the monitor and the HDTV to be connected via a single connector.

The display port is a standard capable of combining low-voltage differential signaling (LVDS), which is the original internal interface standard, with the DVI, which is the external connection standard. The display port has a bandwidth of up to 10.8 Gbps, which is at least twice that of the DVI (up to 4.95 Gbps), and supports multi-stream transmission using the micro-packet architecture so that six streams having a resolution of 1080i (that is, three streams with a resolution of 1080p) can be simultaneously transmitted via a single connector.

The host device 300 comprises a key input unit 310, a central processing unit (CPU) 320, a signal processor 330, an on-screen-display (OSD) generator 335 and a USB communication unit 340. The key input unit 310 comprises keys for setting the output resolution of video according to the occupancy level of the control means on a setting menu, and keys for selecting whether to adjust the resolution on a resolution adjustment selection menu.

The CPU 320 is used as a control means to control the OSD generator 335 to provide the setting menu through which the output resolution of the video can be set according to the occupancy level of the control means, and adjusts the resolution of the video to the output resolution set according to the occupancy level. The occupancy level of the control means corresponds to the number of tasks performed by the CPU 320.

The CPU 320 also controls the OSD generator 335 to provide a resolution adjustment selection menu through which a user can select whether to adjust the resolution of the video to be output to a resolution suitable for the occupancy level.

Additionally, the CPU 320 outputs a warning display command to the monitor 350 so that a warning message may be displayed when the occupancy level reaches a level at which it is impossible to output video.

The signal processor 330 performs predetermined signal processing with respect to the video to be output, converts the processed video into a USB format, and outputs the adjusted video.

The OSD generator 335 generates and outputs a setting menu through which an output resolution of video can be set according to the occupancy level of the control means, and a resolution adjustment selection menu through which a user can select whether to adjust the resolution of the video to be output to a resolution suitable for the occupancy level.

The USB communication unit 340 provides a USB interface to perform communication with the monitor 350. The USB communication unit 340 outputs to the monitor 350 the warning display command output from the CPU 320, the video in the USB format output from the signal processor 330, and the setting menu and resolution adjustment selection menu output from the OSD generator 335.

The monitor 350 is used as a display means, and comprises a USB communication unit 360, a scaler 370, an OSD generator 380 and a display 390.

The USB communication unit 360 provides a USB interface to perform communication with the host device 300. The USB communication unit 360 receives the warning display command, the video in the USB format, the setting menu and the resolution adjustment selection menu, which are output from the host device 300.

The scaler 370 displays the video and various menus received from the host device 300 through the USB communication unit 360 on the display 390.

If the warning display command is input from the host device 300 through the USB communication unit 360, the scaler 370 may control the OSD generator 380 to display the warning message. Additionally, the scaler 370 may check whether a synchronizing signal is input or not in order to display the warning message, and if the synchronizing signal is not input, the scaler 370 may control the OSD generator 380 to display the warning message in the free-run state.

The OSD generator 380 generates a warning message stating that it is impossible to display a normal screen due to the high occupancy level of the control means, and displays the generated message on the display 390.

Although the host device 300 comprises the key input unit 310, CPU 320, signal processor 330, OSD generator 335 and USB communication unit 340, and the monitor 350 comprises the USB communication unit 360, scaler 370, OSD generator 380 and display 390 in the exemplary embodiment of the present invention, the present invention is not limited to the configuration described above.

Accordingly, the exemplary embodiment of the present invention can be implemented with only the control means, namely, the CPU 320, which functions as a master of the host device 300 and the monitor 350, namely, the display means for displaying video. The CPU 320 may check the occupancy level, and if the resolution of the video to be output is greater than the outputtable resolution set according to the checked occupancy level, the CPU 320 may adjust the resolution of the video to be output to the outputtable resolution set according to the checked occupancy level and may then output the adjusted video to the display means.

Figure 4:
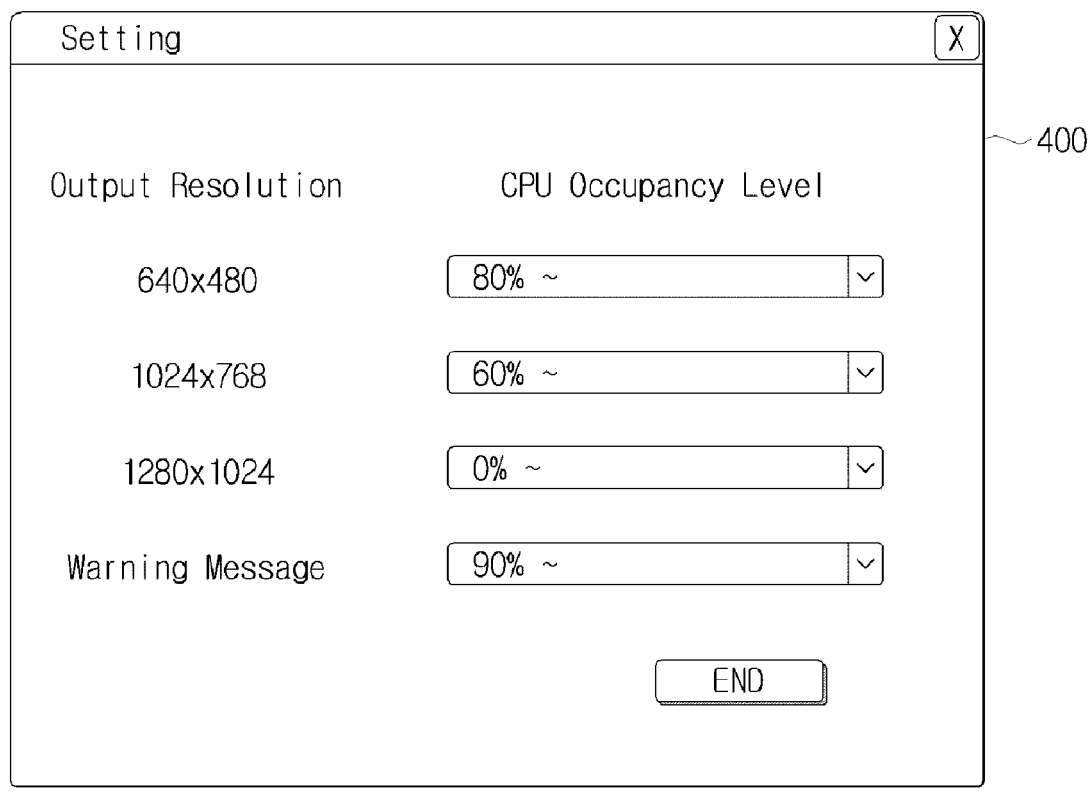
FIG. 4 is a view showing a setting menu according to an exemplary embodiment of the present invention.

FIG. 4 is a view showing a setting menu according to an exemplary embodiment of the present invention.

A setting menu 400 of FIG. 4 enables a user to set the outputtable resolution of the video according to the occupancy level of the control means.

Specifically, the setting menu 400 includes a CPU occupancy selection item to select an appropriate output resolution according to a range of the CPU occupancy level. In other words, the CPU occupancy level can be set for each outputtable resolution.

For example, if the CPU occupancy level is between 80% and 90%, a user may set the output resolution of the video to 640×480, and if the CPU occupancy level is between 60% and 80%, the user may set the output resolution of the video to 1024×768. If the CPU occupancy level is between 0% and 60%, the user may set the output resolution of the video to 1280×1024, and if the CPU occupancy level is over 90%, a warning message may be output. Accordingly, higher resolution video can be output as the CPU occupancy level decreases.

In other words, if the CPU occupancy level is between 80% and 90%, the output resolution of the video may be 640×480, and if the CPU occupancy level is between 60% and 80%, the output resolution of the video may be 1024×768. If the CPU occupancy level is between 0% and 60%, the output resolution of the video may be 1280×1024, and if the CPU occupancy level is over 90%, video cannot be output, and so a warning message can be output.

As described above, the output resolution of the setting menu 400 may be set to 640×480, 1024×768 and 1280×1024 only when the maximum resolution supportable by the monitor 350 is 1280×1024.

The output resolution of the setting menu 400 may vary according to the maximum resolution supportable by the monitor 350. If the output resolution changes, the range of the CPU occupancy level may also be set at a level appropriate for the changed output resolution. The host device 300 is initially connected to the monitor 350 to communicate with the monitor 350 in order to determine the resolution supportable by the monitor 350. Accordingly a user can check the resolution supportable by the monitor 350 using display registration information.

Figure 5:
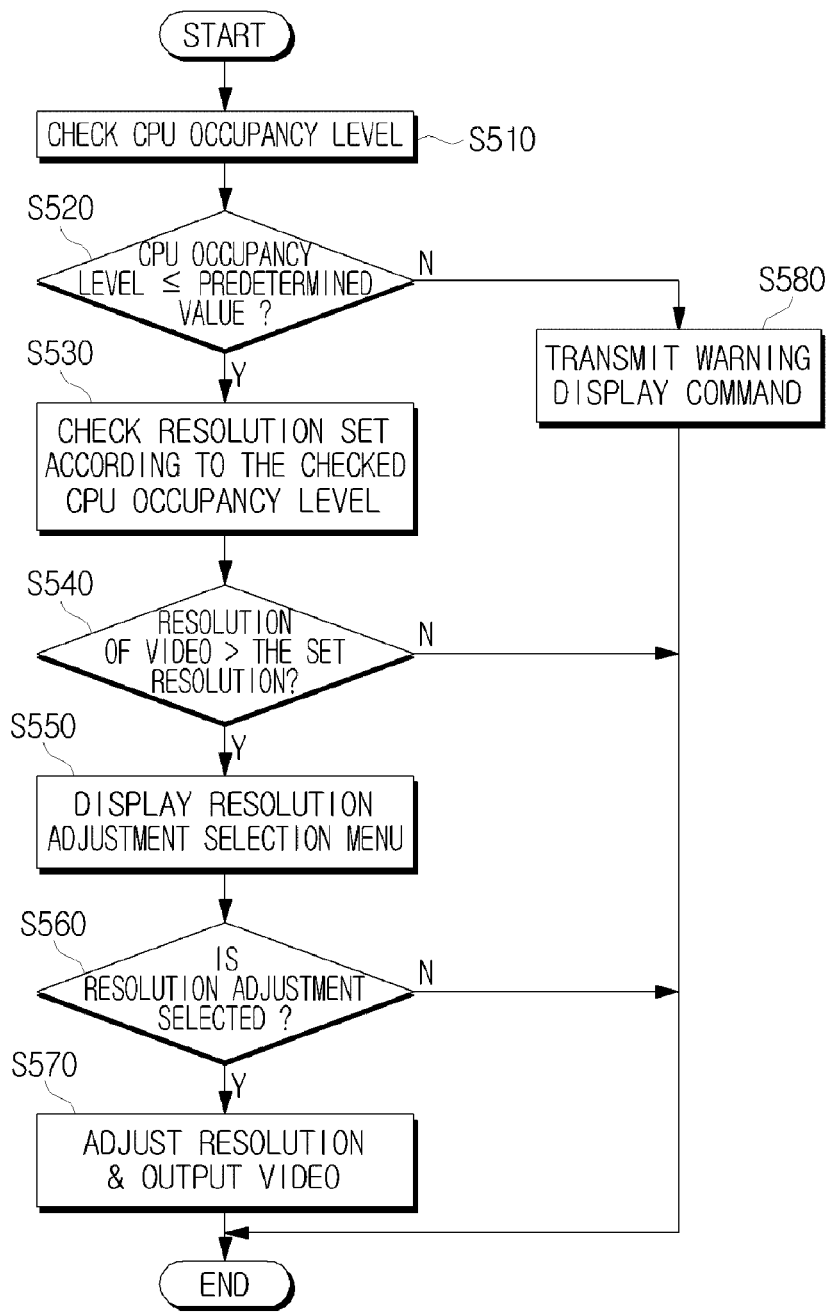
FIG. 5 is a flowchart explaining a process for displaying a video signal in a display system according to an exemplary embodiment of the present invention.

FIG. 5 is a flowchart explaining a process for displaying a video signal in a display system according to an exemplary embodiment of the present invention.

In FIG. 5, the CPU 320 checks the occupancy level of tasks currently performed by the CPU 320 (S510).

The CPU 320 determines whether the checked occupancy level is greater than a predetermined value (S520). Here, the predetermined value means an occupancy level at which it is impossible to output video. For example, the CPU 320 may determine whether or not the occupancy level is 90% or more on the setting menu 400 of FIG. 4.

If it is determined that the checked occupancy level is less than the predetermined value, the CPU 320 may check the output resolution set according to the checked occupancy level (S530). Information regarding the output resolution set according to the CPU occupancy level through the setting menu 400 may be stored in a memory (not shown), and the CPU 320 may check the output resolution set according to the checked occupancy level using the above information stored in the memory.

The CPU 320 also determines whether the resolution of the video to be output is greater than the output resolution set according to the checked occupancy level (S540). In this situation, the output resolution set according to the CPU occupancy level may be a value set by a user through the setting menu 400, or may be a recommended default value preset when the display system is manufactured and unchanged by a user.

If it is determined that the resolution of the video to be output is greater than the output resolution set according to the checked occupancy level, the CPU 320 may control the OSD generator 335 to display the resolution adjustment selection menu through which a user can select whether the resolution of the video to be output is adjusted to the output resolution suitable for the checked occupancy level (S550). In other words, the resolution adjustment selection menu enables the user to select whether the resolution of the video to be output is adjusted to the output resolution set according to the checked occupancy level.

The CPU 320 determines whether resolution adjustment is selected on the resolution adjustment selection menu (S560). If it is determined that resolution adjustment is selected, that is, if a command to adjust the resolution is input through the key input unit 310 on the resolution adjustment selection menu, the CPU 320 may adjust the resolution of the video to be output to the output resolution set according to the checked occupancy level, and may output the adjusted video to the monitor 350 (S570).

If it is determined that the checked occupancy level is greater than the predetermined value in operation S520, the CPU 320 may transmit the warning display command to the monitor 350 (S580).

Figure 6:
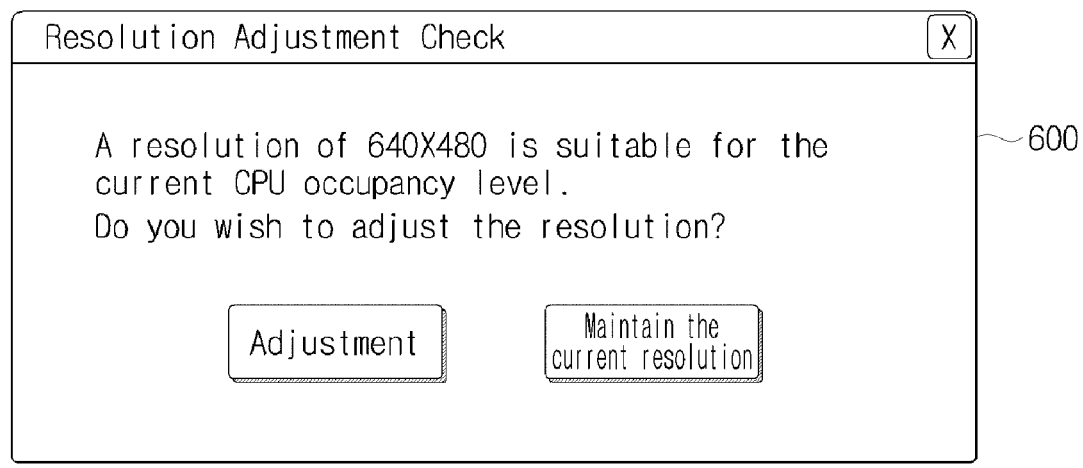
FIG. 6 is a view showing a resolution adjustment selection menu according to an exemplary embodiment of the present invention.

FIG. 6 is a view showing a resolution adjustment selection menu according to an exemplary embodiment of the present invention.

If it is determined that the resolution of the video to be output is greater than the output resolution set based on the current occupancy level of the CPU, a resolution adjustment selection menu 600 of FIG. 6 may be shown through which a user can select whether the resolution of the video to be output is adjusted to the output resolution suitable for the occupancy level.

Specifically, the resolution adjustment selection menu 600 enables a user to decide whether the resolution of the video to be output is adjusted to the output resolution suitable for the current occupancy level of the CPU. For example, if the current occupancy level of the CPU is 80% or more, the output resolution may be set to 640×480 as shown in the setting menu 400 of FIG. 4.

Accordingly, the resolution adjustment selection menu 600 comprises a message stating "A resolution of 640×480 is suitable for the current CPU occupancy level. Do you wish to adjust the resolution?" The resolution adjustment selection menu 600 further comprises a field to select resolution adjustment and a field to maintain the current resolution.

Figure 7:
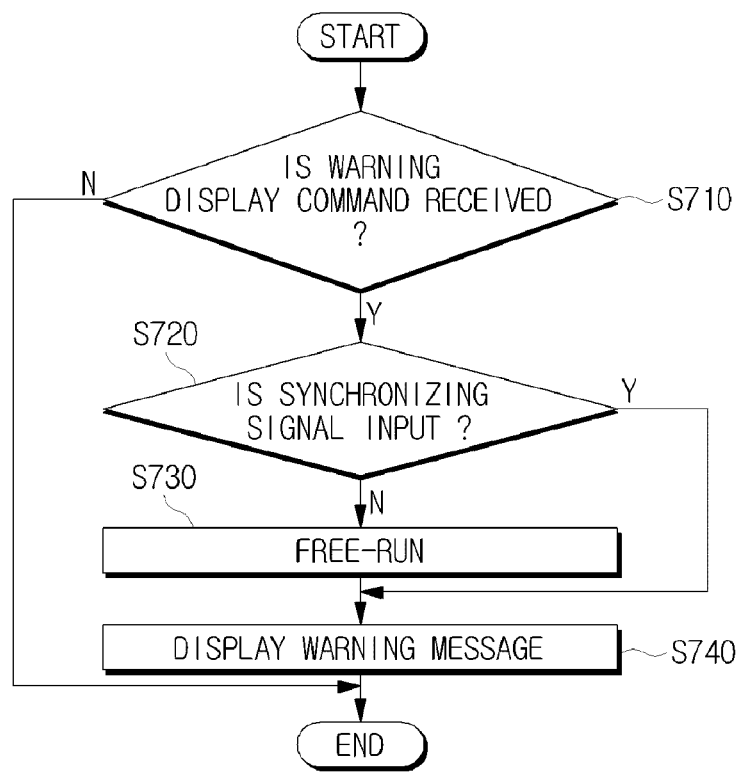
FIG. 7 is a flowchart explaining a process for displaying a warning message in a display system, according to an exemplary embodiment of the present invention.

FIG. 7 is a flowchart explaining a process for displaying a warning message in a display system, according to an exemplary embodiment of the present invention.

In FIG. 7, the scaler 370 of the monitor 350 determines whether a warning display command is received from the host device 300 (S710).

If it is determined that the warning display command is input, the scaler 370 may determine whether a synchronizing signal is input from the host device 300 (S720).

If it is determined that the synchronizing signal is not input, the scaler 370 may execute a free-run mode (S730). The free-run mode enables the warning message to be displayed without the input of the synchronizing signal.

The scaler 370 controls the OSD generator 380 to display the warning message (S740).

Figure 8:
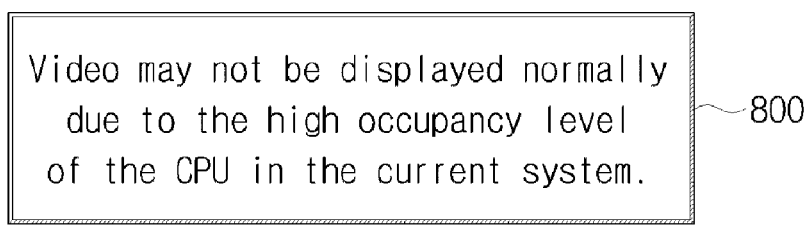
FIG. 8 is a view showing a warning message according to an exemplary embodiment of the present invention.

FIG. 8 is a view showing a warning message according to an exemplary embodiment of the present invention.

If it is determined that the current occupancy level of the CPU is greater than the set predetermined value, a warning message 800 may be displayed notifying that an abnormal screen may be displayed, as shown in FIG. 8.

For example, if the current occupancy level of the CPU is 90%, the CPU 320 may cease transmitting normal video to the monitor 350, and the warning display message may be transmitted to the monitor 350 and displayed. Accordingly, the scaler 370 may control the OSD generator 380 to display a warning message stating "Video may not be displayed normally due to the high occupancy level of the CPU".

Figure 9:
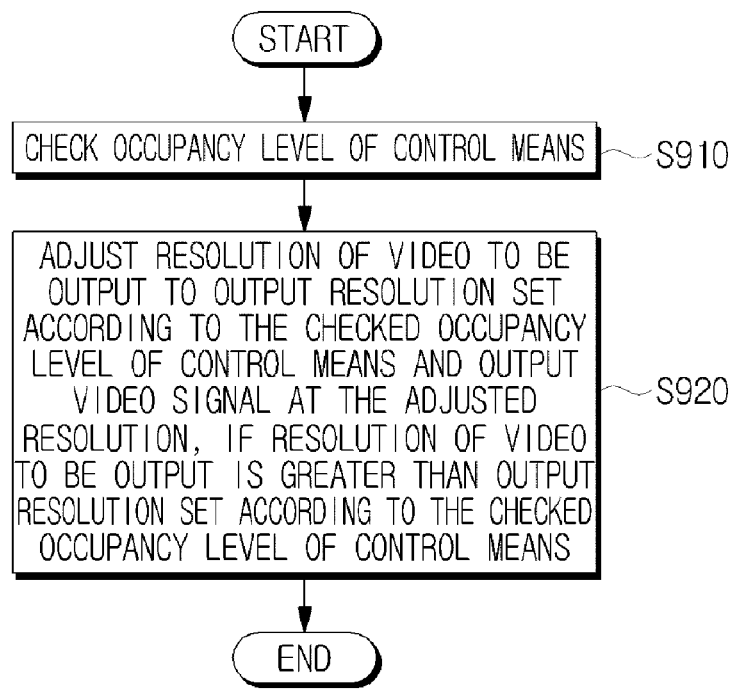
FIG. 9 is a flowchart comprehensively explaining a process for displaying a video signal in a display system according to an exemplary embodiment of the present invention.

FIG. 9 is a flowchart comprehensively explaining a process for displaying a video signal in a display system according to an exemplary embodiment of the present invention.

In FIG. 9, the control means checks the occupancy level for tasks currently performed by the control means (S910).

If it is determined that the resolution of the video to be output is greater than the output resolution set according to the checked occupancy level of the control means, the control means may adjust the resolution of the video to be output to the output resolution set according to the checked occupancy level of the control means, and may output the video at the adjusted resolution (S920).

Figure 10:
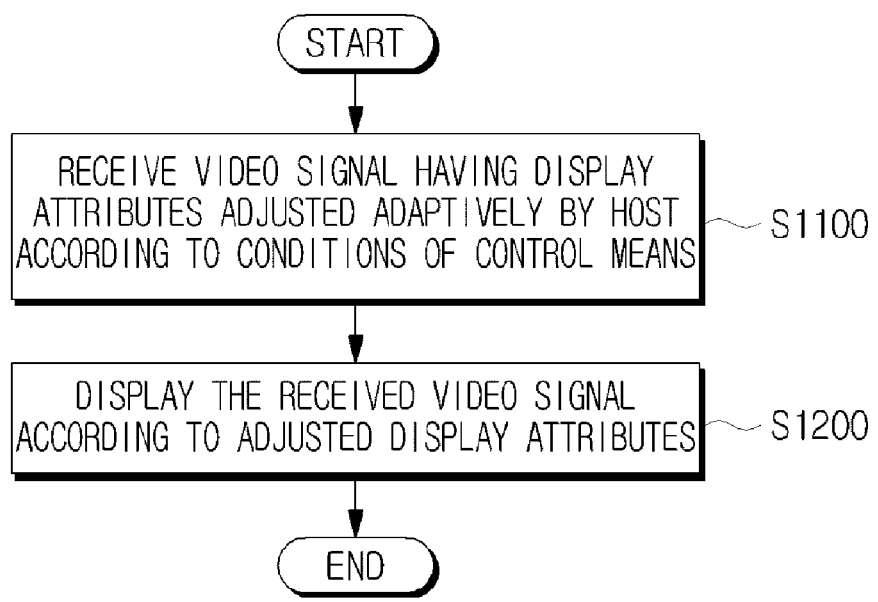
FIG. 10 is another flowchart comprehensively explaining a process for displaying a video signal in a display system according to an exemplary embodiment of the present invention.

FIG. 10 is another flowchart comprehensively explaining a process for displaying a video signal in a display system according to an exemplary embodiment of the present invention.

In FIG. 10, a display means receives a video signal having display attributes adjusted adaptively according to the conditions of a control means by a host (S1100).

The display means displays the video signal received from the host according to the display attributes (S1200).

As described above, according to the exemplary embodiment of the present invention, the host device checks the current occupancy level of the CPU and determines whether the resolution of the video to be output is at a level suitable for the current occupancy level of the CPU. If it is determined that the resolution of the video to be output is not at a level suitable for the current occupancy level of the CPU, the host device may determine that the image quality may be reduced. Accordingly, the host device may provide a user with the resolution set by the user according to the current occupancy level of the CPU or with the recommended resolution, and may allow the user to adjust the resolution of the video to be output to the resolution set by the user or to the recommended resolution.

Additionally, if the current occupancy level of the CPU reaches the level at which it is impossible to output video, the host device may allow the warning message to be displayed, so that the user may know why the video is not being displayed normally.

Although the host device may provide a user with video displayed at the resolution set by the user according to the current occupancy level of the CPU or with the recommended resolution, and may enable the user to adjust the resolution of the video to be output to the resolution set by the user or to the recommended resolution, as described above, the exemplary embodiments of the present invention are not limited thereto.

The host device may provide a setting menu through which the CPU occupancy level can be selected for each outputtable resolution, may check the current occupancy level of the CPU and may determine whether the resolution of the video to be output is at a level suitable for the current occupancy level of the CPU. If it is determined that the resolution of the video to be output is not at a level suitable for the current occupancy level of the CPU, the host device may automatically adjust the resolution of the video to be output to the resolution set by the user according to the current occupancy level of the CPU or to the recommended resolution and may output the video at the adjusted resolution.

As described above, the host device transmits the warning display command to the monitor so that the warning message is displayed when the current occupancy level of the CPU reaches the level at which it is impossible to output video.

However, the exemplary embodiments of the present invention are not limited thereto, and accordingly the host device may generate and display the warning message by itself.

In other words, it is possible to change the display attributes of the video signal according to the control conditions of the host device and then display the video. The control conditions of the host device may comprise not only the CPU occupancy level but also the mode of the video signal. Additionally, the brightness, contrast and sharpness may be changed according to the control conditions, in addition to the resolution of the video signal.

According to the exemplary embodiment of the present invention described above, it is possible to always provide a user with video optimized according to the occupancy level of the CPU. Additionally, if a normal screen is not displayed, a warning message may be displayed informing a user of the reason therefor, which increases user convenience.

In addition, a user may adaptively adjust the display attributes of a video signal and output the video signal having the adjusted attributes through a video signal providing device, such as a PC, and thus if the user sets the display environment to minimum levels when using a display apparatus, the optimum display state can be maintained.

Moreover, a user can easily acquire display setting information of a video signal currently being displayed.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for displaying a video signal in a display system comprising a host comprising a control means for controlling a plurality of devices and a video signal output unit for outputting a video signal, and a display means for displaying the output video signal, the method comprising:
   adjusting, by the host, a resolution of the video signal to be output, according to an occupancy level of the control means, and outputting the video signal at the adjusted resolution; and
   displaying, by the display means, the video signal having the resolution adjusted by the host.

2. The method as claimed in claim 1, wherein the host comprises a computer, and
   the occupancy level of the control means relates to the number of tasks performed by a central processing unit (CPU) of the computer.

3. The method as claimed in claim 1, wherein the adjusting comprises:
   checking the occupancy level of the control means;
   determining whether the checked occupancy level of the control means reaches a level at which it is impossible to output video; and
   if it is determined that the checked occupancy level of the control means does not reach the level at which it is impossible to output video, confirming an outputtable resolution that is set according to the checked occupancy level of the control means.

4. The method as claimed in claim 3, wherein the adjusting further comprises providing, if the resolution of the video signal to be output is greater than the outputtable resolution, a resolution adjustment selection menu through which a user can select whether the resolution of the video signal to be output is adjusted to the outputtable resolution.

5. The method as claimed in claim 4, wherein the resolution adjustment selection menu provides one of the outputtable resolution and a preset recommended resolution; and wherein the resolution adjustment selection menu further comprises a field to select resolution adjustment and a field to maintain the current resolution.

6. The method as claimed in claim 4, wherein the adjusting further comprises adjusting, if a resolution adjustment command is input through the resolution adjustment selection menu, the resolution of the video signal to be output to the outputtable resolution.

7. The method as claimed in claim 3, wherein the adjusting further comprises transmitting a warning display command to the display means if it is determined that the checked occupancy level of the control means reaches the level at which it is impossible to output video.

8. The method as claimed in claim 1, further comprising providing a setting menu through which a user can set an outputtable resolution according to the occupancy level of the control means, wherein the setting menu comprises a field to select the outputtable resolution according to the occupancy level of the control means.

9. A display system comprising:

a host having a control means which controls a plurality of devices and a video signal output unit which outputs a video signal, wherein the host adjusts a resolution of a video signal to be output according to an occupancy level of the control means and outputs the video signal at the adjusted resolution; and a display means which displays the video signal output from the host.

10. The display system as claimed in claim 9, wherein the host comprises a computer, and the occupancy level of the control means relates to the number of tasks performed by a central processing unit (CPU) of the computer.

11. The display system as claimed in claim 9, wherein the control means checks the occupancy level, determines whether the checked occupancy level reaches a level at which it is impossible to output video, and, if it is determined that the checked occupancy level of the control means does not reach the level at which it is impossible to output video, confirms an outputtable resolution that is set according to the checked occupancy level.

12. The display system as claimed in claim 11, wherein the host comprises an on-screen-display (OSD) generator which provides a resolution adjustment selection menu; and if the resolution of the video signal to be output is greater than the outputtable resolution, the control means controls the OSD on-screen-display generator to provide the resolution adjustment selection menu through which a user can select whether the resolution of the video signal to be output is adjusted to the outputtable resolution.

13. The display system as claimed in claim 12, wherein the resolution adjustment selection menu provides one of the outputtable resolution and a preset recommended resolution, and wherein the resolution adjustment selection menu comprises a field to select resolution adjustment and a field to maintain the current resolution.

14. The display system as claimed in claim 13, wherein, if a resolution adjustment command is input through the resolution adjustment selection menu, the control means adjusts the resolution of the video signal to be output to the outputtable resolution.

15. The display system as claimed in claim 11, wherein the control means transmits a warning display command to the display means if it is determined that the checked occupancy level of the control means reaches the level at which it is impossible to output video.

16. The display system as claimed in claim 15, wherein the display means comprises:

a display on which a warning message is displayed;

an on-screen-display (OSD) generator which displays the warning message; and a scaler which controls the OSD generator to display the warning message if the warning display command is input.

17. The display system as claimed in claim 16, wherein the scaler determines whether a synchronizing signal is input in order to display the warning message, and controls the OSD generator in a free-run state if it is determined that the synchronizing signal is not input.

18. The display system as claimed in claim 12, wherein the on-screen-display generator provides a setting menu through which a user can set the outputtable resolution according to the occupancy level of the control means, wherein the setting menu comprises a field to select the outputtable resolution according to the occupancy level of the control means.

19. The display system as claimed in claim 9, wherein the host communicates with the display means via one of a universal serial bus (USB), a unified display interface (UDI) and a display port.

20. A method for displaying a video signal in a display system containing a host with a control means for controlling a plurality of devices and a video signal output unit for outputting a video signal, and a display means for displaying the output video signal, the method comprising:

receiving a video signal having display attributes adjusted adaptively according to conditions of the control means by the host; and displaying the video signal received from the host.

21. The method as claimed in claim 20, wherein the conditions of the control means comprise a mode of the video signal, and the host may adjust the display attributes adaptively according to the mode of the video signal.

22. The method as claimed in claim 21, wherein the mode of the video signal comprises a game mode, a movie mode, an Internet mode and a text mode;

and wherein the display attributes comprise a resolution and a brightness which are capable of being adjusted adaptively according to the mode of the video signal.

23. The method as claimed in claim 20, wherein the conditions of the control means comprise an occupancy level of the control means, the host comprises a computer, and the occupancy level of the control means relates to the number of tasks performed by a central processing unit of the host.

24. The method as claimed in claim 21, wherein the display attributes adjusted by the host are displayed through an on-screen-display.

25. The method as claimed in claim 24, wherein the on-screen-display is displayed overlapping with the video signal output from the host, or is displayed for a predetermined period of time by an on-screen-display generator included in the display means in response to a control command from the control means of the host.

* * * * *